United States Patent [19]
Williams

[11] Patent Number: 5,915,881
[45] Date of Patent: Jun. 29, 1999

[54] METHOD AND COMPOSITION OF A CLAY SLURRY CAPPING SYSTEM FOR LANDFILL AND MINERAL WASTE AREAS

[75] Inventor: Jerald R. Williams, Athens, Ga.

[73] Assignee: Reclamation Technology, Inc., Marietta, Ga.

[21] Appl. No.: 08/846,561

[22] Filed: Apr. 30, 1997

[51] Int. Cl.$^6$ .................................................. B09B 1/00
[52] U.S. Cl. ...................... 405/129; 405/263; 405/270
[58] Field of Search .................................... 405/128, 129, 405/263, 270; 210/901; 588/250, 259

[56] References Cited

U.S. PATENT DOCUMENTS

| | | | |
|---|---|---|---|
| 3,016,713 | 1/1962 | Deming . | |
| 3,586,624 | 6/1971 | Larson | 210/747 |
| 3,732,697 | 5/1973 | Dickson | 405/129 |
| 3,772,893 | 11/1973 | Eilers . | |
| 3,986,365 | 10/1976 | Hughes . | |
| 4,430,021 | 2/1984 | Wagner et al. | 405/129 |
| 4,908,129 | 3/1990 | Finsterwalder et al. | 405/129 X |
| 5,112,665 | 5/1992 | Alexander | 428/102 |
| 5,161,915 | 11/1992 | Hansen | 405/129 |
| 5,201,608 | 4/1993 | Kugler | 405/129 |
| 5,346,566 | 9/1994 | White | 156/71 |
| 5,426,079 | 6/1995 | Hughes | 502/80 |
| 5,439,317 | 8/1995 | Bishop et al. | 405/128 |
| 5,550,315 | 8/1996 | Stormont | 588/259 |
| 5,710,362 | 1/1998 | Vesilind et al. | 588/259 |

OTHER PUBLICATIONS

*The Swelling of Clays: Molecular Simulations of the Hydration of Montmorillonite*, pp. 1102–1104, Science, vol. 271, Feb. 23, 1996; S. Karaborni, B. Smit, W. Heidug, J. Urai, E. van Oort.

*Primary Examiner*—George Suchfield
*Attorney, Agent, or Firm*—Thomas, Kayden, Horstemeyer & Risley, L.L.P.

[57] ABSTRACT

A method and composition are shown for capping exposed land areas, such as landfills, toxic waste sites, and mineral waste sites areas. A formulation is prepared by making a hydrated solution of a particular sodium Bentonite clay and mixing the solution with a specific proportion of sand material. The mixture is distributed over a prepared subgrade by means of a slurry pumping technique. A multilayer cap is created by overlaying additional layers having different clay formulations. The clay mixtures are optimized to be effective water and oxygen barriers while eliminating the problem of desiccation cracking. An anisotropic barrier is achieved as a result of interlayer hydraulic conductivity differences. This barrier together with the establishment of a 1–6% slope of the layer interface encourages lateral movement of water while inhibiting its downward penetration. The overall hydraulic conductivity of the composite cap is extremely low. Therefore, the cap provides a very durable cover that is essentially impervious to oxygen and water penetration. Also, the top layer is made to support a stand of native vegetation to control erosion.

19 Claims, 1 Drawing Sheet

METHOD AND COMPOSITION OF A CLAY SLURRY CAPPING SYSTEM FOR LANDFILL AND MINERAL WASTE AREAS

FIELD OF THE INVENTION

The present invention relates generally to the field of landfill waste disposal systems and more specifically to a method and composition of a clay slurry capping system for landfills which meets or exceeds all specifications of local, state and federal environmental regulation agencies.

BACKGROUND OF THE INVENTION

It is well recognized that the safe disposal of municipal and industrial waste products is an extremely important issue that is now receiving a great deal of attention. The issue is not only to develop adequate techniques and means of handling these wastes but to also correct the serious problems that been created in the past due to improper and unsafe disposal practices. Serious contamination of the environment has resulted from the lack of knowledge, or intent, to implement cost effective methods for the disposal, storage and containment of these undesirable products. The problem is magnified many fold by the great number of waste disposal and mineral waste areas.

In many situations such as landfills and mineral mining operations, where on line or in-situ processing is technically not feasible or other reasons make it cost prohibitive, a reasonable alternative is to store, contain and create an isolation covering over those wastes, provided this can be accomplished successfully. This course of action has been pursued at many locations with some success but with all too many failures.

In efforts to develop effective covers for waste, the unique characteristics of water-swelling clays have been used extensively. The mineral sodium montmorillonite, generally known as sodium Bentonite, has been one of these commonly used clays. As reported in an article authored by S. Karaborni et al. in the Feb. 23, 1996 issue of the publication Science, "[c]lays have a characteristic layered structure. Between these layers, water can adsorb, which results in strong repulsive forces that cause the clays to expand to as much as several times their original thickness. Clay hydration studies have been conducted since 1933, yet there is no clear understanding of the swelling mechanism." Nevertheless, water-swelling clays have been used by industry in a large number of products and in a variety of applications.

The use of hydrated clay solutions in drilling operations of the oil and gas industry is a good example of how the unique expanding property of Bentonite clay is used to advantage. The drilling fluid, commonly known as "mud," performs a number of functions. In brief, the mud is pumped down the drilling shaft where its circulation lubricates and cools the drill bit, helps seal the bored formations, prevents pressure blowouts and most importantly holds drill cutting particles in suspension while the particles are carried away and brought to the surface. U.S. Pat No. 5,426,079 to Hughes describes in detail the characteristics of water-swellable clays, particularly Bentonite, and their use in drilling muds.

U.S. Pat. No. 5,439,317 to Bishop et al. discloses a process of suspending solid particles in a hydrated clay solution. A first step involves the creation of a hydrated clay solution. Several other steps require the addition of solid particles of mining by-products to the hydrated solution for the purpose of suspending a large quantity of particles in the solution while transporting them to an underground storage location.

Some soil sealing applications mix Bentonite clays with other ingredients in both a wet and dry condition. For example, U.S. Pat. No. 3,016,713 to Deming discloses a method of treating soil surfaces with an aqueous slurry of a lattice clay (Bentonite) and an additive of a water-soluble anionic polyelectrolyte to render the walls and bottoms of stock ponds and other water reservoirs impervious. U.S. Pat. No. 3,986,365 to Hughes teaches a soil sealing method by adding an amount of a particular water-soluble polymer to a dry Bentonite-soil admixture whereby the polymer addition decreases the amount of Bentonite necessary to form a water containing soil enclosure. U.S. Pat. No. 3,772,893 to Eilers teaches a soil sealing method to reduce the permeability of soil solids to water by mixing a dry mixture of an expanding lattice clay and a linear water soluble organic polymer to a layer of soil. The a final step of the process involves compacting the treated layer of soil.

Bentonite clays also serve as water barrier elements in geosynthetic fabric liners. Those liners consist of a layer of dry Bentonite clay sandwiched between two nonwoven geotextile fabrics. U.S. Pat. No. 5,346,566 to White and U.S. Pat. No. 5,112,665 to Alexander each describe geosynthetic fabric liner systems. Geosynthetic clay liners of this type serve as landfill covers and water barriers to eliminate the need of a compacted clay layer. Although those liners have low hydraulic conductivity specifications and are cost competitive, when compared with compacted clay, seam integrity is a potential problem and material and installation costs remain a concern.

Compacted clay covers are a traditional method of complying with the requirements of the U.S. Environmental Protection Agency. Compacted clay typically comprises a bottom layer of a three layer system, and can consist of native soil mixed with a 4–8% by weight of dry Bentonite clay. Compacting this layer slightly "wet of optimum" initially achieves the design hydraulic conductivity; however, those designs have been shown to be vulnerable to desiccation cracking, especially when installed in arid environments. Desiccation cracking drastically reduces the effectiveness of the cover and can even result in cap failure. In general, compacted clay covers not only have inherent problems but are very expensive and difficult to construct.

Because of the inadequacies of the current state-of-the-art environmental protection measures, various governmental agencies are actively engaged in programs which promote the development or improvement of environmental restoration and management technologies. A key and integral part of this program is an effort to encourage the development and implementation of new and innovative landfill cover design and installation procedures.

SUMMARY OF THE INVENTION

The present invention relates to a method of creating a protective cover useful for capping an aggregate of materials found in sanitary landfills, toxic waste sites, and mineral waste areas for the purpose of preventing those materials from contaminating the surrounding environment. The cover may be comprised of a basic material made from mixing various amounts sand material with a hydrated solution of a water-swellable clay (sodium Bentonite). The installed cover may be configured to form single and/or multiple layer structure wherein individual layers of the multiple layer embodiment have different formulations of hydrated clay and sand.

The inventive method may require sequential installation of the layers by a slurry distribution technique, wherein each layer comprises a specially designed thickness. The exact number, arrangement and thickness of the layers depends on the specific application for the cover. However, in all cases the configuration is optimized to create an effective composite barrier to water penetration.

An important feature of the inventive cover comprises a unique combination of techniques to collectively achieve a superior and innovative cover design, as compared to prior art cover designs. Using the method according the present invention, Applicant has found that by mixing a relatively small amount of hydrated sodium Bentonite clay with sand produces a product that has the desirable characteristics of low permeability and high resistance to desiccation cracking. Both of those properties are essential to the creation of an efficient and durable water barrier. The inventive method creates a cover having layers of different permeability formulations by varying the ratio of hydrated clay to the sand material. The method according to the present invention formulates each layer to accomplish a specific function. For example, present invention utilizes the lowest permeability mixture to create a primary water barrier, and installs that barrier as a bottom layer of the composite cap. Depending on the application and desired performance in hydraulic conductivity, more than one layer of this type may be used. The present invention may also configure two vertically adjacent intermediate layers to have sufficiently different permeabilities to form an anisotropic barrier between them. This barrier is an additional inhibiting factor to the downward penetration of water. The upper intermediate layer comprises a higher permeability and upon installation includes a contour with a 2–6% slope. Therefore, the upper intermediate layer acts as a drainage layer by encouraging the lateral movement of water. A top layer of the composite cap is specially formulated to support the growth of native vegetation.

The method according to the present invention, which creates various hydrated clay mixtures in a layered, slurried distribution process, produces a composite cover that has a very low hydraulic conductivity and, along with other attributes, eliminates the need for mechanical soil compaction. As a result, the present invention comprises a capping technology for the creation of a high performance landfill cover that has permanent durability and has the advantage of being more economical than traditional methods.

DETAILED DESCRIPTION OF THE INVENTION

Material Formulation

Figure 1:
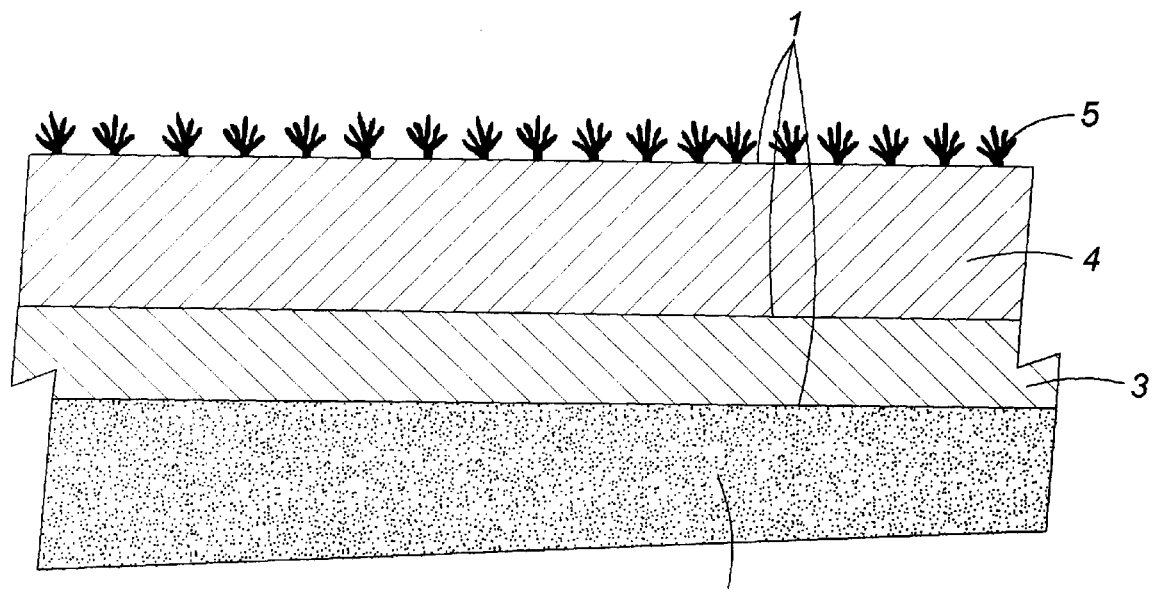
FIG. 1 is a cross-sectional view of the cover design of the invention.

The present invention utilizes a multiple step process to formulate the material required to create the cover cap. First, a hydrated clay solution is made by adding sodium Bentonite (minimum 80% clay content) with water in a solution having a concentration of approximately 8–12% sodium Bentonite by weight and approximately 88–92% water by weight. The sodium Bentonite-water (hydrated clay) solution is mixed to obtain a consistency of loose mud. Second, the hydrated clay solution is mixed with an amount of granular material comprising river, eolian, glaciated sand material and/or sandy soil. The concentration of the sand in the hydrated clay solution may be varied from approximately 0.5 to approximately 5.0% by weight. The sand-hydrated clay material is mixed vigorously to suspend the sand particles in solution. Next, water is added until the sand-hydrated clay mixture comprises approximately 25–35% water by weight to create a pumpable slurry.

EXAMPLE

Laboratory Evaluation of Clay/Sand Mixtures

Sand-hydrated clay mixtures with varying weight percentages of clay (0%, 1%, 2%, 3%, 4% and 5%) were prepared using a motorized overhead paddle within a mixing container. Permeameters having a 6.0 cm diameter received 10.0 cm columns of the resulting slurries. Water at a 40.0 cm pressure head was introduced on top of the 10.0 cm of material in the permeameter and hydraulic conductivity was measured by a falling head method to calculate saturated hydraulic conductivity (K) in cm/s. Sand material with no added clay was used as a control, and replicate treatments (3 for each sand-hydrated clay treatment) were added. Measurements were made over a 100 day period. The data indicate very low values of saturated hydraulic conductivity and they show significant improvement in hydraulic for up to a 4% by weight clay content by weight before leveling off. The results are shown in Table 1, which include values for mean saturated hydraulic conductivity K in cm/sec for various sand-hydrated clay mixtures.

TABLE 1

| % Clay (by weight) | 0% | 1% | 2% | 3% | 4% | 5% |
|---|---|---|---|---|---|---|
| Mean K (cm/sec) | $5.2 \times 10^{-4}$ | $6.5 \times 10^{-6}$ | $2.8 \times 10^{-7}$ | $1.9 \times 10^{-7}$ | $1.0 \times 10^{-7}$ | $1.0 \times 10^{-7}$ |

Similar hydraulic conductivity tests were performed with two layers of hydrated clay-sand mixtures (1% over 2%, 1% over 3% and 1% over 4%). The data indicate a further reduction in hydraulic conductivity as compared to a single layer. The results of the two layer tests are shown in Table 2, which illustrates saturated hydraulic conductivities K (cm/sec) of sand-hydrated clay mixtures composed of layers with different percentages of clay.

TABLE 2

| layer1/layer2 (% by weight of clay) | 1%/2% | 1%/3% | 1%/4% |
|---|---|---|---|
| Mean K (cm/s) | $2.8 \times 10^{-7}$ | $1.3 \times 10^{-7}$ | $6.1 \times 10^{-8}$ |

Finally, hydraulic conductivity tests were repeated using a multi-layer configuration of 1% over 4% over 1% over 4%. The result of these tests showed a small reduction in hydraulic conductivity as compared with the two layer (1% over 4%) configuration. The mean value of the saturated hydraulic conductivities of the hydrated clay-sand mixes composed of multiple layer with different percentages of clay was $5.5 \times 10^{-8}$ cm/s.

To test for resistance to desiccation cracking, the clay/sand slurries (1%, 2%, 3% and 4%) were poured into 8 cm diameter containers which were placed into a controlled oven. The temperature was maintained at 48° C. for a period of three days. At the end of this time, there was no discernible cracking verifying that the slurry mixtures have negligible shrinkage.

Basic Cover Design

A basic cover design consisting of two layers of either (1% over 2%, 1% over 3%, or 1% over 4% by weight) is shown in FIG. 1. Referring to FIG. 1, the capping system includes multiple layers disposed at approximately 3 to 5% slope as indicated by the numeral 1. Typically, each of these layers is approximately 5 to 60 centimeters in thickness. In the particular embodiment, shown in FIG. 1 a subgrade 2 receives a 2% clay by weight slurry prepared in accordance with the above-referenced method, which is designated as base layer 3. Base layer 3 receives a 1% clay by weight slurry prepared in accordance with the above-referenced method, which is designated as layer 4. Layer 4 is capable of supporting the growth of native vegetation 5.

The capping system illustrated in FIG. 1 has a hydraulic conductivity in the range of $2.8\times10^{-7}$ to $5.5\times10^{-8}$ cm/s. Also, the thickness of the layers can be varied from this basic design to meet the requirements of a specific application. If a lower hydraulic conductivity cap is necessary, a 4% clay mixture can be used as the bottom layer. For the lower percentage layers (i.e. 1 or 2% clay), mechanical scaping may be required to achieve the desired surface slope.

Application Requirements

The U.S. Environmental Protection Agency (EPA, 1991) has recommended cover designs to comply with the Resource Conservation Recovery Act (RCRA) Subtitle C and Subtitle D regulated facilities. Subtitle D covers must have a maximum hydraulic conductivity of $1\times10^{-6}$ cm/sec while the maximum value allowed for Subtitle C covers is $1\times10^{-7}$ cm/sec.

The basic cover design of this technology (two layers, 1% over 2%) meets the requirement of the Subtitle D specification. For a Subtitle C cover, a two layer configuration of 1% over 3% or 4% can be utilized. In all cases, the surfaces are sloped to encourage water runoff and vegetation planted to control erosion and improve esthetic appearance. It is to be understood that, although described and depicted herein primarily as a cap that forms a top surface, the system can similarly be used as a liner to prevent seepage of the landfill waste.

In concluding the detailed description, it should be noted that it will be obvious to those skilled in the art that many variations and modifications can be made to preferred embodiments without substantially departing from the principles of the present invention. All such variations and modifications are intended to be included herein within the scope of the present invention, as set forth in the following claims.

What is claimed is:

1. A method of creating a multilayer slurried clay capping system comprising the following steps:
    adding water to a water-swellable clay to form a hydrated clay solution; mixing an amount of granular material with the hydrated clay solution in a ratio that produces a mixture that has a specific value of hydraulic conductivity;
        adding an additional amount of water to the mixture to create a pumpable slurry, distributing the slurry over a land area to create a base layer; and
    overlaying the base layer with one or more additional layers where each layer has a designed ratio of hydrated clay solution to granular material.

2. A method according to claim 1 wherein the water-swellable clay is sodium Bentonite.

3. A method according to claim 1 wherein the granular material is a readily available sand.

4. A method according to claim 1 wherein the granular material is a readily available sandy soil.

5. A method according to claim 1 wherein the hydrated clay solution is between approximately 8–12% sodium Bentonite by weight and approximately 92–88% water by weight.

6. A method according to claim 1 wherein the concentration of the granular material in the hydrated clay solution used to form the base layer and additional layers is in the range of approximately 0.5 to 5% by weight.

7. A method according to claim 1 wherein the pumpable slurry is created by the addition of water to the mixture in the amount of approximately 20 to 35% by weight.

8. A method according to claim 1 wherein the thickness of each individually deposited layer is in the range of approximately 5 to 60 centimeters.

9. A method according to claim 1, wherein the ratios of hydrated clay solution to granular material are optimized to produce mixtures that resist desiccation cracking.

10. A method according to claim 1 wherein the hydraulic conductivity of one layer is made sufficiently lower that the layer immediately above it so that an anisotropic barrier to water penetration is formed.

11. A method according to claim 1 wherein the layers are installed and contoured with a slope of approximately 2 to 6% to further encourage the lateral movement of water.

12. A method according to claim 1 wherein the cap is utilized to cover exposed land areas such as landfills toxic waste sites and mineral waste areas.

13. A method according to claim 1 wherein the cap is utilized as a bottom liner for landfills, hazardous waste sites and mineral waste areas.

14. A multiple layer slurried clay capping system comprising: a base layer formed from a hydrated clay slurry solution including a water-swellable clay and a granular material in a ratio that produces a mixture that has a specific value of hydraulic conductivity having a concentration of approximately between 8–12% sodium Bentonite by weight and water in a concentration approximately between 92–88% by weight, wherein said slurry is adapted to be distributed over a land area; and
    at least one additional layer of the hydrated clay slurry overlaying the base layer, said additional layer also having a concentration of approximately between 8–12% sodium Bentonite by weight and water in a concentration of approximately between 92–88% by weight.

15. A system according to claim 14 wherein the water-swellable clay is sodium Bentonite.

16. A system according to claim 14 wherein the granular material is a readily available sand.

17. A system according to claim 14 wherein the granular material is a readily available sandy soil.

18. A system according to claim 14 wherein the concentration of the granular material in the hydrated clay solution used to form the base layer and additional layers is in the range of approximately 0.5 to 5% by weight.

19. A system according to claim 14 wherein the thickness of each individually deposited layer is in the range of approximately 5 to 60 centimeters.

\* \* \* \* \*